3,275,637
MODIFIED QUINACRIDONES
William A. West, Westfield, N.J., assignor to E. I. du Pont de Nemours and Company, Wilmington, Del., a corporation of Delaware
No Drawing. Filed Nov. 18, 1965, Ser. No. 509,260
14 Claims. (Cl. 260—279)

This invention relates to materials for improving the dispersion properties of quinacridone pigments and to improved quinacridone pigments containing such materials. More specifically, it relates to ortho-carboxybenzamidomethylquinacridone compounds and their use to improve the properties of quinacridone pigment dispersions in coating compositions. Still more specifically, it relates to ortho-carboxybenzamidomethylquinacridone compounds and their mixtures with other quinacridone compounds to produce quinacridone pigments which can be incorporated into vehicles to yield coating compositions substantially free from variation in color resulting from a variation in the method by which the coating composition is applied, as well as yielding other improvements as set forth below. This application is a continuation-in-part of co-pending U.S. application Serial Number 317,114.

Coating compositions pigmented with a quinacridone pigment, particularly coating compositions containing strongly polar solvents, may exhibit pronounced differences in color depending upon the method of application of the coating composition, the amount of dispersive effort applied while depositing the coating composition, and the degree to which the coating composition film is disturbed during drying. Also, enamels pigmented with a quinacridone pigment may show objectionable high viscosity so as to limit the quantity of pigment which can be incorporated into the coating composition and still maintain adequate flow for practical use. Moreover, the tinctorial properties of coating compositions may be adversely affected by the poor degree of dispersion of a quinacridone pigment therein so that both the saturation and depth of color of the dispersion are inferior to those of a corresponding dispersion wherein the quinacridone pigment is more completely dispersed.

Another deficiency of some quinacridone pigments is a pronounced tendency to undergo crystal growth both in aqueous systems necessary to the isolation of the pigments as well as under the influence of the solvents present in coating compositions. This effect is often quite noticeable during the milling of the coating composition and manifests itself in some decrease in the effective tinting strength of the pigments. Means to effectively prevent such crystal growth have not heretofore been known.

Both the color variations and deficiencies aforementioned and the limited flow of the coating compositions are believed to be functions of the poor state of dispersion of the pigment in the vehicle. Coating compositions exhibiting these defects often contain a large proportion of pigment in the form of loosely bound pigment clusters, agglomerates, and the like, so that the pigment is not dispersed to the optimum degree. The internal cohesive forces in such pigment clusters, agglomerates, and the like, are often sufficiently weak to permit them to break down under a shearing force, such as that which results from the brushing of a coating composition film containing the pigment or from the passage of the pigmented coating composition through a zone of intense turbulence and shear. The color of a film of a coating composition which contains such incompletely dispersed pigments depends on the extent to which the pigment is freed of the clusters and agglomerates, which varies with the manner in which the coating is applied. For example, in the automotive industry the main body of the car may be sprayed, which operation tends to break up loosely bound pigment clusters and agglomerates, whereas the fenders may be dipped, an operation which has little pigment dispersive effect. Consequently, the body and fenders may differ in color when a given coating composition is used which contains incompletely dispersed pigment as previously described. Another example of the same problem is found in brush applications where, in lapping a freshly painted surface over a surface painted a short time previously, it is frequently observed that the brush strokes on the previously painted surface give a considerably higher degree of color strength than is shown in the adjacent freshly painted surface. In such an instance, the high shear produced on rubbing the partially dried previously painted surface tends to disperse the pigment clusters and agglomerates, which are then unable to re-form because of the high consistency of the dispersion medium.

Terms such as "flocculation" are frequently used in the art to describe the color variations regardless of their cause; but, as pointed out in U.S. Patent 2,967,841, the term "flocculation" properly refers to only one cause of the color variations. Consequently, the term "shear-strength uniformity" has come into use in the art as the preferred term to describe the degree of color variation resulting from variation in the methods of application of the coating composition and will be so used herein.

This invention resides in the discovery that new quinacridone compounds containing one or more substituent ortho-carboxybenzamidomethyl groups may be used in coating compositions in admixture with other quinacridone compounds to yield coating compositions which show substantial improvement in the tinctorial and rheological properties of such compositions. This beneficial effect is found when the new substituted quinacridone compounds are present in amounts as little as 5% or less of the total quinacridone type pigment and the effects may be manifested in one or more of the following properties:

(1) Improved shear-strength uniformity,
(2) Improved tinctorial strength and intensity,
(3) Prevention of crystal growth,
(4) Lower viscosity of the coating composition.

With respect to the prior art, several patents describe the effect on the coating composition uniformity of various substituent groups in the copper phthalocyanine molecules and also the addition of nitrocellulose to improve the shear-strength uniformity of a coating composition pigmented with copper phthalocyanine. The use of aluminum benzoate with copper phthalocyanine is described in U.S. Patent 2,327,472; and the use of a polyvalent metal salt, preferably the aluminum salt of a copper phthalocyanine polysulfonic acid, to improve the shear-strength properties of phthalocyanine pigments is disclosed in U.S. Patent 2,816,045. Also, U.S. Patent 2,855,403 described a non-flocculating, non-crystallizing phthalocyanine pigment which was prepared by reacting a nitrogenous base with a phthalocyanine substituted with 0.01 to 2.0 ortho-carboxybenzamidomethyl groups.

An object of this invention is an improvement in shear-strength uniformity of quinacridone pigments. Another object is the preparation of a quinacridone pigment which can be admixed with other quinacridone pigments to improve the shear-strength uniformity of coating compositions containing such pigments. A further object is the preparation of ortho-carboxybenzamidomethylquinacridone compounds. A still further object is to provide quinacridone-type pigments which can be incorporated into vehicles to yield coating compositions which are substantially free from variations in color resulting from the type of method used in applying the coating composition. A still further object is to provide quinacridone-type pigments which yield coating compositions of improved tinctorial and rheological properties. Other objects will be readily apparent from the description given hereinafter.

The ortho-carboxybenzamidomethylquinacridone compounds can be prepared by moderately heating a sulfuric acid solution of a quinacridone, a phthalimide and paraformaldehyde and precipitating from solution the resulting quinacridone compound. These compounds can be characterized by the formula:

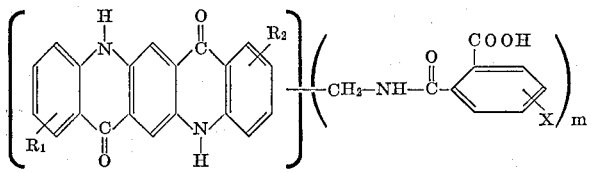

wherein the ortho-carboxybenzamidomethyl groups are substituted for aromatic hydrogen on the terminal rings, $m$ is an integer of from 1 to 4 inclusive, $R_1$ and $R_2$ are selected from the group consisting of hydrogen, chlorine, fluorine, bromine, methyl and methoxy and X is selected from the group consisting of hydrogen, fluorine, chlorine, bromine, methyl and methoxy.

As will be shown in Example II, the extent of introduction of ortho-carboxybenzamidomethyl groups in the quinacridone molecule can be varied by altering the ratio of the phthalimide and paraformaldehyde to quinacridone in the synthesis.

The shear-strength uniformity of the pigments of this invention is preferably illustrated by incorporating them in an alkyd coating composition since problems with this property are particularly troublesome in alkyd vehicles. Such a test may be conveniently applied to the quinacridone-type pigments of this invention as follows: To prepare the full shade enamel:

Weigh into ½ pint glass jar of approximately 2½ inches inside diameter:

| | Grams |
|---|---|
| Quinacridone pigment | 15.0 |
| Alkyd resin solution (coconut oil modified nonoxidizing glyceryl phthalate resin as a 60% solid solution in a mixture of 71% xylene, 24% high flash naphtha, and 5% butanol; weight of 60% solids solution) | 31.3 |
| V.M.P. naphtha | 30.0 |
| Xylene | 30.0 |
| ⅛ inch steel shot | 350.0 |

The mixture is ball-milled in conventional fashion by rotating the jar on rollers. After grinding, for 72 hours, the following are added to the mill:

| | Grams |
|---|---|
| Alkyd resin solution (as described above) | 46.6 |
| V.M.P. naphtha | 13.5 |
| Xylene | 13.5 |

The added material is thoroughly incorporated by milling for 20 to 30 minutes. The balls are then separated by screening and the remainder is added to:

| | Grams |
|---|---|
| Alkyd resin solution (as described above) | 50.0 |
| 55% solution in butanol/xylene (44%/56%) of melamine-formaldehyde resin | 59.8 |
| V.M.P. naphtha | 5.0 |
| Xylene | 5.0 |

To test the properties of the enamel, a tint is prepared by mixing:

| | Grams |
|---|---|
| Full shade enamel (prepared as described in the first part of the example) | 18.0 |
| White enamel, based on above alkyd resin modified with melamine resin and having the following composition | 101.0 |

| | Grams |
|---|---|
| $TiO_2$ | 17.2% |
| Alkyd resin solids | 31.9% |
| Melamine resin solids | 13.7% |
| Xylene | 18.6% |
| V.M.P. naphtha | 18.6% |

After thorough mixing, this red enamel is applied to a suitable metal panel by conventional spraying. After the coating has dried, a portion of the panel is given a second coating by dipping it in the coating composition. When the dipped coating is dried, the enamel is rated for shear-strength uniformity on the basis of the relative appearance of the sprayed and dipped portions of the panel. The two portions are practically identical in appearance in the case of pigments yielding coating compositions of excellent shear-strength uniformity, whereas a marked color difference exists in the case of coatings having poor shear-strength uniformity.

Alternatively, but less preferred, the coating may be rated by comparing the appearance of a conventional sprayed coating and a portion of the coating which has been disturbed by rubbing while tacky before drying. The test is conducted as follows:

After thorough mixing, the light red enamel, prepared as described in the first part of this example, is applied to a suitable metal panel by spraying in conventional fashion. After drying approximately 15 minutes, but before the coating is completely dry, one end of the coating on the panel is rubbed with moderate pressure. When the coating is completely dry, the enamel is rated for shear-strength uniformity on the basis of the relative color appearance of the rubbed portion compared with the unrubbed portion. Systems exhibiting poor shear-strength uniformity show a marked development in color on the rubbed portions relative to the unrubbed section, whereas those rated excellent in shear-strength uniformity show substantially no color development as the result of the rubbing.

The foregoing methods are employed to determine shear-strenghth uniformity of the following specific examples of this invention. These examples are intended to be merely illustrative of the invention and not in limitation thereof. All parts are by weight unless otherwise specified.

*Example I.—Preparation of ortho-carboxybenzamidomethylquinacridone*

To 590 parts of 98% sulfuric acid is added 100 parts of quinacridone which is stirred into solution at about 45° to 50° C. The solution is then cooled to about 35° C., 52.2 parts of phthalimide is added; and the mixture is stirred for 10 minutes after which 9.63 parts of paraformaldehyde is sifted in during 10 minutes. The mixture is stirred for 30 minutes at about 50° to 55° C. and is then added with stirring to approximately 6000 parts of ice water to precipitate the ortho-carboxybenzamidomethylquinacridone from solution. The bright red precipitate is isolated in conventional fashion by filtration and washing with water until free from sulfate. The bulk of the material is retained as the water-wet filter cake but a small portion of the sample is purified further by washing with ethanol and the washed product is then dried. The ethanol-washed product after drying analyzes as follows:

| | Calculated for $C_{29}H_{19}N_3O_5$, percent | Found, percent |
|---|---|---|
| Carbon | 71.17 | 72.43 |
| Hydrogen | 3.89 | 4.05 |
| Nitrogen | 8.59 | 8.45 |

The product is a bright red pigment somewhat yellower in hue and inferior in tinting strength to pigmentary gamma phase quinacridone but superior in shear-strength uniformity.

*Example II.—Variation in degree of substitution with ortho-carboxybenzamidomethyl groups*

The number of ortho-carboxybenzamidomethyl groups introduced into the quinacridone molecule can be varied by altering the ratio of phthalimide and paraformaldehyde to quinacridone in the synthesis. The present example shows an increase in this ratio, relative to that of Example I, to obtain a greater degree of substitution than is obtained in Example I:

100 parts of quinacridone is stirred to solution in 650 parts of 98% sulfuric acid during about 30 minutes at 45° to 50° C. The solution is then cooled to about 35° C. and 104.4 parts of phthalimide is added. The mixture is then stirred for another 10 minutes, 19.3 parts of paraformaldehyde is sifted in, and stirring is then continued for a further 30 minutes at a temperature of about 50° to 55° C. The product is isolated by drowning the acid solution in about 6000 parts of water, then filtering, washing and drying the resulting filter cake. A bright red pigment is obtained. It is somewhat more soluble in dilute alkali than the product of Example I and is also less strongly colored. The product contains about 2 ortho-carboxybenzamidomethyl groups per molecule of quinacridone.

When the amount of phthalimide is increased to 141 parts and the amount of paraformaldehyde is increased to 32 parts, proceeding otherwise as above, an orange-red solid is obtained in a yield of 236 parts (87.4% theory) which without further purification has the following analysis:

|  | Calculated for $C_{47}H_{33}N_5O_{11}$, percent | Found, percent |
|---|---|---|
| C | 66.90 | 67.22 |
| H | 3.94 | 3.50 |

This product contains essentially 3 equivalents of ortho-carboxybenzamidomethyl groups in the molecule.

By further increasing the phthalimide to 188 parts and the paraformaldehyde to 43 parts, up to 4 carboxybenzamidomethyl groups may be introduced.

In an alternate procedure which has some advantageous features, the introduction of multiple groups may be carried out step-wise by allowing the reaction to go to completion with, for instance, one equivalent of phthalimide and of paraformaldehyde followed by the step-wise addition of further equivalents of the reactants.

*Example III.—Blends with conventional pigments*

The instant example describes a preferred procedure wherein the ortho-carboxybenzamidomethylquinacridone is intimately mixed with quinacridone:

80 parts of quinacridone in the beta crystalline phase is charged into a ball mill with 20 parts of anhydrous aluminum chloride and 4000 parts of balls, the charge occupying approximately 60% of the ball mill. The charge is milled for approximately 18 hours, then discharged through a sieve to remove the balls. 90 parts of the milled mixture is dusted into a solution of 100 parts glacial acetic acid, 160 parts of water and 2.5 parts of a diamine diacetate cationic surfactant, during a period of about 30 minutes, the temperature being maintained below 40° C. The mixture is stirred at 35° to 40° C. for one hour and then 500 parts of water and 5.0 parts of ortho-carboxybenzamidomethylquinacridone, prepared as described in Example I, in the form of water-wet filter cake, is added. The resultant mixture is heated to 70° to 80° C. and maintained at that temperature for 2 hours. The pigment is then isolated by filtration, washing and drying in conventional fashion. When dispersed in an alkyd paint, the product is stronger, yellower and more intense than a corresponding pigment made without the use of ortho-carboxybenzamidomethylquinacridone; and the coating composition exhibits excellent shear-strength uniformity when tested by the methods previously described. The improved tinctorial properties are particularly evident in blends of the quinacridone pigment with molybdate orange, the blend containing the ortho-carboxybenzamidomethylquinacridone showing much greater color depth and intensity than the corresponding one with conventional quinacridone in the absence of ortho-carboxybenzamidomethylquinacridone.

Similar improvements are evident when a corresponding blend is made of quinacridone with any of the products of Example II.

*Example IV.—Blends with quinacridone solid solutions*

Beneficial effects of ortho-carboxybenzamidomethylquinacridone are also obtained with pigmentary solid solutions of two or more quinacridone compounds.

A solid solution of quinacridone and quinacridonequinone containing approximately 60% quinacridone (see U.S.P. 3,160,510) is a maroon colored pigment (quinacridone maroon) widely used in coating compositions, particularly in automotive finishes where shear-strength uniformity is especially important. Such a solid solution may be conveniently prepared and treated as follows:

A ball mill with an internal diameter of about 24 inches and a total capacity of about 60 gallons is charged with 1000 lbs. of "Cyl-Pebs" (cylindrical bars of iron approximately one-half inch in diameter and one inch long). Nine lbs. (100 parts) of quinacridone and 6 lbs. (66 parts) of quinacridonequinone are charged into the ball mill together with about 58 lbs. (644 parts) of commercial aluminum sulfate $(Al_2(SO_4)_3 \cdot 15-18H_2O)$ and about 1.3 lbs. (14.4 parts) of tetrachloroethylene. The mill is rotated at a speed of about 40 r.p.m. (about 74% of critical speed) for 24 hours at a temperature of about 40° C., after which the mixture of aluminum sulfate and pigment is discharged from the mill through a screen which retains the "Cyl-Pebs." The mill powder is then added to and thoroughly wet with about 1000 lbs. of 5% solution of sulfuric acid and the salt and soluble impurities are dissolved by stirring for about one hour near the boiling point. After this, the pigment is solated by filtering, washing free of soluble salts and drying at about 60° C. Such a product may be treated prior to drying with the product of Example I as follows: 55.5 parts of the mill powder before extraction is added with stirring to a solution containing 317 parts of water, 21 parts 98% sulfuric acid, 0.05 part of non-ionic surfactant comprised of an aliphatic polyoxyethylene ether-alcohol, and 0.5 part of the product of Example I. The mixture is heated to 95° C. and stirred at 95° to 100° C. for 2 hours, after which the pigment is islolated by filtration and washing and drying the filter cake. Dispersions of the product prepared in this way, in either fortified alkyd vehicles or in acrylic enamels of the automotive type, show excellent shear-strength uniformity, are markedly superior tinctorially and lower in viscosity than unmodified quinacridone maroon. These improved properties are a consequence of better state of dispersion than counterpart dispersions made with the same starting quinacridone maroon processed in a similar manner but without the use of ortho-carboxybenzamidomethylquinacridone.

*Example V.—Mixture with acid-swelled quinacridone pigments*

The beneficial effects obtained in mixtures of ortho-carboxybenzamidomethylquinacridone with quinacridone maroon prepared by milling as described in Example IV can also be obtained in mixtures with quinacridone maroon prepared as follows by an acid-swelling process:

80 parts of a crude maroon pigment comprising a mixture of about 60% quinacridone and 40% quinacridonequinone which may be obtained by the process of U.S.P. 3,148,075 is charged to a ball mill with 20 parts of anhydrous aluminum chloride and 4000 parts of ½ inch steel balls. The total mill charge (including balls) occupies about 60% of the mill volume. The charge is milled for approximately 48 hours by rotating the mill in conventional fashion at about 75% of the critical speed. The mill powder is separated from the balls by sieving and 90 parts thereof is added gradually with stirring to a solution containing 100 parts of glacial acetic acid, 160 parts of water and 2.5 parts of a diamine-diacetate cationic surfactant. The mixture is stirred for one hour at 35° to 40° C., then 560 parts of water and 5 parts (dry basis) of ortho-carboxybenzamidomethylquinacridone in the form of a water-wet presscake, are added, and the mixture is stirred at 35° to 40° C. for 2 hours. The pigment is then isloated by filtration, washing and drying. A dispersion of the dried product in a melamine-fortified alkyd enamel is superior in gloss and when metallized, shows a more desirable color change on varying the angle of viewing ("flip-flop") than the corresponding enamel made from similarly milled crude quinacridone without the use of ortho-carboxybenzamidomethylquinacridone. Shear-strength uniformity is excellent.

Crude pigments comprising quinacridone and quinacridonequinone in various other proportions may also be used in the process of this example, with appropriate variations in the color properties. For instance, a product containing about 25% quinacridone and 75% quinacridonequinone in solid solution is an attractive gold pigment in which the beneficial effects of the additive agent are quite apparent.

*Example VI. — Ortho-carboxybenzamidomethylquinacridone with gamma phase quinacridone*

Pigmentary gamma phase quinacridone is prepared as described in U.S. Patent 2,844,581 by acid pasting quinacridone from sulfuric acid in the manner well known in the art to obtain an alpha phase pigment, allowing this alpha phase product to stand in contact with dimethylformamide, then isolating and drying the pigment. 94 parts of the gamma phase quinacridone powder resulting from this treatment is slurried in about 500 parts of 5% sulfuric acid together with 6 parts of ortho-carboxylbenzamidomethylquinacridone and the mixture is stirred at 95° C. for 2 hours. It is then filtered, washed free of acid and dried to give 100 parts of pigment. The resulting product is superior in tinctorial properties and exhibits superior dispersion in coating compositions when compared to a counterpart which does not contain the ortho-carboxybenzamidomethylquinacridone. In melamine-fortified alkyd enamel vehicles, the treated product is strong, intense and yellow compared to the conventional material. Mass-tone color of the treated product is also darker than that of the control; and further, the treated pigment gives a more attractive blend with molybdate orange, in terms of increased intensity and depth, than the control counterpart.

*Example VII. — Ortho-carboxybenzamidomethylquinacridone with quinacridone and 2,9-dimethylquinacridone*

A solid solution containing 60% quinacridone and 40% 2,9-dimethylquinacridone is prepared by a suitable milling procedure. More specifically the ball mill used in Example IV is charged with a mixture of 9 lbs. quinacridone, 6 lbs. 2,9-dimethylquinacridone, 58 lbs. of commercial aluminum sulfate ($Al_2(SO_4)_3 \cdot 15-18H_2O$) and 1.3 lbs. of tetrachloroethylene. The mill is rotated at 40 r.p.m. for 24 hours at a temperature of about 50° C. after which the mixed powder is discharged from the mill. The powder is then added to 1000 lbs. of a 5% solution of sulfuric acid and stirred until thoroughly wet. It is then heated for about one hour near the boiling point, filtered and washed free of soluble salts leaving a water wet filtercake.

A portion of this filtercake containing 95 parts of solids is slurried with additional water and throughly blended with a portion of the water wet filtercake from Example I containing 5 parts of o-carboxybenzamidomethylquinacridone. The resulting slurry is filtered and dried at 60° C. When the product is incorporated into an automotive acrylic lacquer, the resulting millbase has significantly lower viscosity than a lacquer of equivalent solids made from the untreated solid solution. The treated product also shows greater transparency and gloss in masstone and increased strength in tint compared to the untreated solid solution. Essentially the same results are obtained when 95 parts of the untreated solid solution is copulverized with 5 parts of the product of Example I.

In thermosetting acrylic enamels (fortified with melamine), viscosity control of coating compositions containing the solid solution of quinacridone and 2,9-dimethylquinacridone is a significant problem. The introduction of 5% of the tri-substituted product of the second part of Example II effectively controls this property. For instance, in one composition, the untreated control does not flow at all through a No. 4 Ford cup (a well known method of testing viscosity control—see ASTM D-1200) whereas the treated product of this paragraph has a 37 second flow.

*Example VIII. — Ortho-carboxybenzamidomethylquinacridone with 2,9-dimethylquinacridone*

A water wet presscake containing 95 parts of 2,9-dimethylquinacridone is slurried in additional water and thoroughly blended with a portion of the water wet filtercake of Example I containing 5 parts of o-carboxybenzamidomethylquinacridone. The product shows improved shear-strength uniformity in alkyd coating compositions in comparison to the untreated 2,9-dimethylquinacridone.

*Example IX.—Preparation of o-carboxybenzamidomethyl-4,11-dichloroquinacridone*

19.1 parts (0.05 mole) of 4,11-dichloroquinacridone is added in portions to 186 parts of conc. $H_2SO_4$ while the temperature is maintained below 30° C. Stirring is continued until solution is complete whereupon 7.4 parts (0.05 mole) of phthalimide is added followed by 1.65 parts (0.05 mole) of paraformaldehyde (91% minimum purity). The temperature is raised to 60–65° C. and held for 2 hours and the solution is added dropwise to 2000 parts of a stirred mixture of ice and water. The slurry is filtered, washed free of acid and may be dried if desired to give 24 parts of the o-carboxybenzamidomethyl derivative of 4,11-dichloroquinacridone which is considerably more yellow in hue than the product of Example II.

*Example X.—Ortho-carboxybenzamidomethyl-4,11-dichloroquinacridone with quinacridone and 4,11-dichloroquinacridone*

A solid solution comprising 60% quinacridone and 40% 4,11-dichloroquinacridone may be made by milling appropriate amounts of the two ingredients using the process of Example VII and finally drying to give a yellow shade quinacridone red pigment (frequently called a scarlet). By copulverizing 95 parts of this pigment with 5 parts of the product of Example IX, there is obtained a yellow shade red pigment which is greatly improved in shear-strength uniformity and is more transparent and has higher strength than the untreated scarlet solid solution when incorporated in alkyd coating composition. It has the advantage over using the product of Example I as the treating agent that it gives a much yellower final product.

*Example XI.—Prepartion of 2'-carboxy-4'-chlorobenzamidomethylquinacridone*

46.8 parts (0.15 mole) of quinacridone is added in portions to 475 parts of conc. $H_2SO_4$ and the mixture stirred at a temperature not exceeding 50° C. until solution is complete. After cooling to 30° C., 27.1 parts (0.15 mole) of 4-chlorophthalimide is added followed, after thorough mixing, by 4.9 parts of paraformaldehyde (91% purity).

The solution is then heated to 50–55° C. for 1½ hours, cooled and added dropwise to 3000 parts of a stirred mixture of ice and water. The precipitated solid is filtered, washed free of acid and dried to give 70 parts of 2'-carboxy-4'-chlorobenzamidomethylquinacridone. This product is similar in color to the product of Example I and when used in amounts of about 5% of the total mix in appropriately prepared mixtures with untreated quinacridone pigments, it promotes shear-strength uniformity, transparency of masstone and improved strength of tint. It may be used, for instance, with beta phase quinacridone and with the solid solution of Example VII.

*Example XII.—Direct preparation of a quinacridone pigment mixture containing 5% o-carboxybenzamidomethylquinacridone*

A quinacridone pigment in which 5 mole percent of the molecules are substituted with o-carboxybenzamidomethyl groups is made directly as follows:

312 parts (1.0 mole) of crude quinacridone is added gradually to 1800 parts of 98% $H_2SO_4$ at a maximum temperature of 30° C. and stirred until solution is complete. Thereupon 7.4 parts (0.05 mole) of phthalimide is added followed by 1.65 parts (0.05 mole) paraformaldehyde (91% purity) and the solution is heated at 50–55° C. for 30 minutes. The final solution is added dropwise to 18,000 parts of a rapidly stirred mixture of ice and water to precipitate the pigment. The slurry is filtered, washed free of acid and dried to give 318 parts of a quinacridone pigment containing approximately 5% by weight of o-carboxybenzamidomethylquinacridone, which exhibits high resistance to flocculation in alkyd enamels.

The ortho-carboxybenzamidomethylquinacridone compounds are bright red pigments of good color quality in addition to possessing outstanding shear-strength uniformity properties. These novel pigments may be prepared from unsubstituted quinacridone as shown in Example I and equally as well from a dichloroquinacridone as in Example IX. Moreover, such products may also be made from other substituted quinacridones such as the difluoro-, dibromo-, dimethyl-, and dimethoxyquinacridones. Additionally, the phthalimide used in the reaction may also be substituted as shown in Example XI and such substitution may include, not only chlorine, but also fluorine, bromine, methyl or methoxy groups. The degree of substitution of the o-carboxybenzamidomethyl groups in the quinacridone molecule is not critical. The examples show a preference for mono-substitution (one such group per molecule) but this can be increased up to as much as 4 groups per quinacridone molecule. It is to be noted that all of the ortho-carboxybenzamidomethylquinacridones herein described that are useful in this invention will correspond to the generic formula indicated above.

Because of the presence of the substituent carboxy groups, such compounds show greater solubility in alkali than conventional quinacridone pigments and are also somewhat weaker in pigment strength. Because of these factors, and also due to their higher cost, it is preferred to restrict the use of these compounds in blends with conventional quinacridone pigments to an amount sufficient to impart improved shear-strength uniformity and other desirable properties to the prior art products without significantly impairing the strength or alkali resistance.

The examples have shown that blends in which about 5% of the total weight of the quinacridone composition consists of the o-carboxybenzamidomethylquinacridones of this invention have excellent characteristics with respect to the improved properties desired, but this amount may be varied widely depending on the basic pigment employed and pigment strength desired. When as little as about 0.5% by weight of the composition is o-carboxybenzamidomethylquinacridone, there is definite evidence of improved properties, though such a small amount may not be the optimum. It is permissible to have much larger amounts than 5% up to as much as about 25% by weight of the agent present, however the lower strength of the treating agent and the somewhat poorer lightfastness may make such use less desirable in some applications. A preferred range is that there be from about 1% to 15% by weight o-carboxybenzamidomethylquinacridone compounds present in the total pigment composition.

The degree of substitution in the quinacridone molecule by o-carboxybenzamidomethyl groups is not critical and pigment compositions containing quinacridone molecules having from 1 to 4 of the groups substituted thereon are useful in this invention so long as the essential requirement that the final pigment compositions contain from about 0.5% to 25% by weight of o-carboxybenzamidomethylquinacridone compounds is met.

The preferred method for obtaining the blended compositions of this invention is by blending a conventional quinacridone pigment (free of o-carboxybenzamidomethyl groups) with an o-carboxybenzamidomethylquinacridone compound containing approximately one o-carboxybenzamidomethyl group per molecule, but the composition may also be obtained by controlled introduction of the requisite substituent groups following the general procedure of Example XII.

The o - carboxybenzamidomethylquinacridone compounds exert their beneficial effect in simple mechanical mixtures, but for optimum effect it is preferred to prepare a more intimate mixture than is obtained by mixing in conventional fashion. The o-carboxybenzamidomethylquinacridone compounds can be admixed with a quinacridone pigment in any convenient manner as by dry mixing, acid pasting, acid swelling, milling and the like or can be added simply to the paint grind.

The beneficial effects of the use of o-carboxybenzamidomethylquinacridone compounds with other pigments of the quinacridone class are evident with all types of quinacridone pigments. These include not only all crystal phases of quinacridone, but also 4,11-dichloroquinacridone, 2,9-dichloroquinacridone, 3,10-dichloroquinacridone, 2,9-difluoroquinacridone, 3,10-difluoroquinacridone, 4,11-difluoroquinacridone, 2,9-dimethylquinacridone, 4,11-dimethylquinacridone, 2,9-dimethoxyquinacridone, 4,11-dimethoxyquinacridone, quinacridonequinone, 2,9-dichloroquinacridonequinone, 4,11 - dichloroquinacridonequinone and solid solutions of two or more quinacridone compounds, such as quinacridone maroon and the like.

The magnitude of the effect of the added orthocarboxybenzamidomethylquinacridone compound varies with the nature of the vehicle in which the pigment is dispersed. Beneficial effects are observed in all vehicles such as alkyd enamels, melamine fortified alkyd enamels, thermosetting acrylic enamels, and acrylic lacquers. Similarly, the effect is believed to be generally applicable to all organic vehicles, although in some instances sufficiently good dispersion is obtained with conventional quinacridone in the absence of an added agent so that little improvement is evident.

As has been seen, introduction of ortho-carboxybenzamidomethyl substituents into the quinacridone molecule results in products which can be added to conventional quinacridone pigments to yield a mixed pigment of improved rheological and tinctorial characteristics. A particular advantages of the use of a substituted quinacridone as a surface active agent in this instance is that, unlike conventional agents, whose lack of color or non-harmonizing color tends to degrade tinctorial quality or strength in the mixed pigment, the quinacridone agent itself has an attractive color and this beneficial effect is evident in the blends.

Since it is obvious that many changes and modifications can be made in the above-described details without departing from the nature and spirit of the invention, it is to be understood that the invention is not to be limited to said details except as set forth in the appended claims.

What is claimed is:
1. A quinacridone compound having the formula:

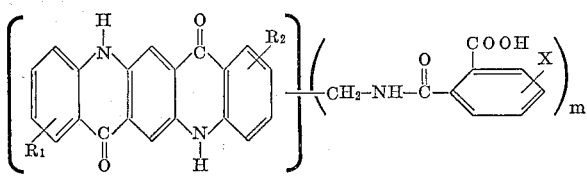

wherein the ortho-carboxybenzamidomethyl groups are substituted for aromatic hydrogen on the terminal rings, $m$ is an integer from 1 to 4 inclusive, X is selected from the group consisting of hydrogen, fluorine, chlorine, bromine, methyl and methoxy, and $R_1$ and $R_2$ are selected from the group consisting of hydrogen, fluorine, chlorine, bromine, methyl and methoxy.

2. The composition of claim 1 in which $R_1$, $R_2$ and X are hydrogen and $m$ is 1.

3. The composition of claim 1 in which $R_1$, $R_2$, and X are hydrogen and $m$ is 3.

4. A pigment composition of improved tinctorial and rheological properties consisting essentially of an intimate mixture of a quinacridone pigment and about 0.5% to 25% by weight based on the total weigth of the pigment composition of at least one of the quinacridone compounds having the formula:

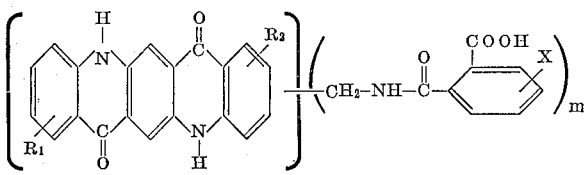

wherein the ortho-carboxybenzamidomethyl groups are substituted for aromatic hydrogen on the terminal rings, $m$ is an integer from 1 to 4 inclusive, X is selected from the group consisting of hydrogen, fluorine, chlorine, bromine, methyl and methoxy, and $R_1$ and $R_2$ are selected from the group consisting of hydrogen, fluorine, chlorine, bromine, methyl and methoxy.

5. The pigment composition of claim 4 in which the quinacridone compound constitutes from about 1% to 15% by weight of the total pigment compositions.

6. The pigment composition of claim 5 wherein the quinacridone pigment is 4,11-dichloroquinacridone and the quinacridone compound is o-carboxybenzamidomethyl,4,11-dichloroquinacridone.

7. The pigment composition of claim 5 wherein the quinacridone pigment is beta phase quinacridone and the quinacridone compound is 2'-carboxy-4'-chlorobenzamidomethylquinacridone.

8. The pigment composition of claim 4 in which the quinacridone compound has the following formula:

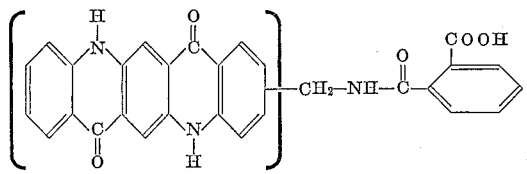

wherein the ortho-carboxybenzamidomethyl group is substituted for aromatic hydrogen on a terminal ring and said quinacridone compound constitutes from about 1% to 15% by weight of the total pigment composition.

9. The pigment composition of claim 8 wherein said quinacridone pigment is beta phase quinacridone.

10. The pigment composition of claim 8 wherein said quinacridone pigment is gamma phase quinacridone.

11. The pigment composition of claim 8 wherein said quinacridone pigment is a solid solution of quinacridone and quinacridonequinone.

12. The pigment composition of claim 8 wherein the quinacridone pigment is a solid solution of 2,9-dimethylquinacridone and quinacridone.

13. The pigment composition of claim 4 in which the quinacridone compound has the following formula:

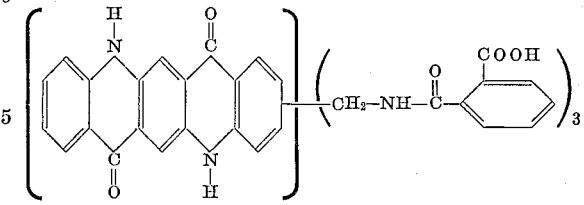

wherein the ortho-carboxybenzamidomethyl groups are substituted for aromatic hydrogen on the terminal rings and said quinacridone compound constitutes from about 1% to 15% by weight of the total pigment composition.

14. The pigment composition of claim 13 wherein the quinacridone pigment is a solid solution of 2,9-dimethylquinacridone and quinacridone.

No references cited.

ALEX MAZEL, *Primary Examiner.*

DONALD G. DAUS, *Assistant Examiner.*